United States Patent
Ryu et al.

(10) Patent No.: US 10,236,503 B2
(45) Date of Patent: Mar. 19, 2019

(54) MIXING DEVICE FOR PREPARING LITHIUM COMPOSITE TRANSITION METAL OXIDE, LITHIUM COMPOSITE TRANSITION METAL OXIDE PREPARED USING THE SAME, AND METHOD OF PREPARING LITHIUM COMPOSITE TRANSITION METAL OXIDE

(71) Applicant: LG Chem, Ltd., Seoul (KR)

(72) Inventors: Ji Hoon Ryu, Daejeon (KR); Sung Joong Kang, Daejeon (KR); Seong Hoon Kang, Daejeon (KR); Sang Seung Oh, Daejeon (KR); Wang Mo Jung, Daejeon (KR); Chi Ho Jo, Daejeon (KR); Gi Beom Han, Daejeon (KR)

(73) Assignee: LG Chem, Ltd. (KR)

( * ) Notice: Subject to any disclaimer, the term of this patent is extended or adjusted under 35 U.S.C. 154(b) by 291 days.

(21) Appl. No.: 14/648,038

(22) PCT Filed: Jan. 2, 2014

(86) PCT No.: PCT/KR2014/000001
§ 371 (c)(1),
(2) Date: May 28, 2015

(87) PCT Pub. No.: WO2014/107022
PCT Pub. Date: Jul. 10, 2014

(65) Prior Publication Data
US 2015/0311521 A1    Oct. 29, 2015

(30) Foreign Application Priority Data
Jan. 3, 2013   (KR) ......................... 10-2013-0000714

(51) Int. Cl.
*B01F 5/02*   (2006.01)
*B01F 7/00*   (2006.01)
(Continued)

(52) U.S. Cl.
CPC ........... *H01M 4/485* (2013.01); *B01F 5/0256* (2013.01); *B01F 7/008* (2013.01); *B01F 13/103* (2013.01);
(Continued)

(58) Field of Classification Search
CPC .... B01F 5/0665; B01F 3/04099; B01F 7/008; B01F 3/0807; B01F 3/04531;
(Continued)

(56) References Cited

U.S. PATENT DOCUMENTS 5,205,647 A * 4/1993 Ricciardi .............. B01F 5/0684
  366/162.2
6,080,510 A   6/2000 Hemmer et al.
(Continued)

FOREIGN PATENT DOCUMENTS

CN   101155751 A   4/2008
DE      3327137 A1 *  2/1984 ............. B01F 7/008
(Continued)

OTHER PUBLICATIONS

Extended Search Report from European Application No. 14735423.7, dated Jun. 3, 2016.
(Continued)

*Primary Examiner* — Charles Cooley
(74) *Attorney, Agent, or Firm* — Lerner, David, Littenberg, Krumholz & Mentlik, LLP

(57) ABSTRACT

A device for preparing a lithium composite transition metal oxide includes first and second mixers continuously arranged in a direction in which a fluid proceeds, wherein the first mixer has a closed structure including a hollow fixed
(Continued)

cylinder, a rotating cylinder having the same axis as that of the hollow fixed cylinder and having an outer diameter that is smaller than an inner diameter of the fixed cylinder, an electric motor to generate power for rotation of the rotating cylinder, a rotation reaction space, as a separation space between the hollow fixed cylinder and the rotating cylinder, in which ring-shaped vortex pairs periodically arranged along a rotating shaft and rotating in opposite directions are formed, first inlets through which raw materials are introduced into the rotation reaction space, and a first outlet to discharge a reaction fluid formed from the rotation reaction space.

14 Claims, 2 Drawing Sheets

(51) Int. Cl.
  *B01J 3/00* (2006.01)
  *C01G 1/02* (2006.01)
  *H01M 4/02* (2006.01)
  *B01F 13/10* (2006.01)
  *B01J 19/18* (2006.01)
  *B01J 19/28* (2006.01)
  *C01B 25/45* (2006.01)
  *H01M 4/485* (2010.01)
  *H01M 10/0525* (2010.01)

(52) U.S. Cl.
  CPC .......... *B01J 3/008* (2013.01); *B01J 19/1806* (2013.01); *B01J 19/1862* (2013.01); *B01J 19/28* (2013.01); *C01B 25/45* (2013.01); *C01G 1/02* (2013.01); *H01M 10/0525* (2013.01); *H01M 2004/028* (2013.01)

(58) Field of Classification Search
  CPC .. B01F 3/0853; B01F 7/00816; B01F 5/0256; B01F 13/103; C12M 27/00; A61K 9/08; A61K 33/00; A61K 9/10; C02F 3/02; C02F 1/727; A23L 2/54; A61J 3/00; C09K 3/00; Y02W 10/15; B01J 19/28; B01J 19/1862; B01J 19/1806; B01J 3/008; H01M 4/485; H01M 10/0525; H01M 2004/028; C01B 25/45; C01G 1/02
  USPC ........................................................ 366/305
  See application file for complete search history.

(56) References Cited

U.S. PATENT DOCUMENTS

| 6,386,751 | B1 * | 5/2002 | Wootan | A01K 63/042 366/170.3 |
| 9,590,242 | B2 * | 3/2017 | Kang | H01M 4/485 |
| 9,722,246 | B2 * | 8/2017 | Noh | H01M 4/5825 |
| 9,843,035 | B2 * | 12/2017 | Noh | H01M 4/136 |
| 9,865,874 | B2 * | 1/2018 | Noh | H01M 4/5825 |
| 9,899,675 | B2 * | 2/2018 | Park | H01M 4/505 |
| 2004/0185336 | A1 * | 9/2004 | Ito | H01M 4/667 429/152 |
| 2005/0056170 | A1 * | 3/2005 | Koike | B01F 3/0811 101/146 |
| 2005/0067122 | A1 * | 3/2005 | Kazem | B01F 7/00816 162/29 |
| 2006/0216602 | A1 | 9/2006 | Larouche et al. | |
| 2009/0253037 | A1 | 10/2009 | Park et al. | |
| 2010/0199559 | A1 * | 8/2010 | Hallett | B01J 4/005 48/127.7 |
| 2010/0227221 | A1 | 9/2010 | Chang et al. | |
| 2010/0261060 | A1 | 10/2010 | Choy et al. | |
| 2010/0296982 | A1 | 11/2010 | Hong et al. | |
| 2013/0129596 | A1 | 5/2013 | Noh et al. | |
| 2014/0234203 | A1 * | 8/2014 | Park | B01J 19/18 423/594.3 |
| 2015/0258524 | A1 * | 9/2015 | Hong | B01F 7/008 252/182.1 |
| 2015/0311521 | A1 * | 10/2015 | Ryu | C01G 1/02 252/182.1 |

FOREIGN PATENT DOCUMENTS

| EP | 1188196 | A1 | | 3/2002 | |
| EP | 2810706 | A1 | | 12/2014 | |
| EP | 2811555 | A1 | | 12/2014 | |
| GB | 627043 | A | * | 7/1949 | ............ B01F 3/0807 |
| GB | 1279736 | A | * | 6/1972 | ............. B01F 7/008 |
| JP | H06254384 | A | | 9/1994 | |
| JP | H078775 | A | | 1/1995 | |
| JP | 2001163700 | A | | 6/2001 | |
| JP | 2009526735 | A | | 7/2009 | |
| JP | 2011507694 | A | | 3/2011 | |
| JP | 2011083768 | A | * | 4/2011 | ............... B01D 9/00 |
| JP | 2011091010 | A | | 5/2011 | |
| KR | 20070082900 | A | | 8/2007 | |
| KR | 20110099935 | A | | 9/2011 | |
| KR | 2012-0015278 | A | | 2/2012 | |
| KR | 2012-0028576 | A | | 3/2012 | |
| KR | 20120086156 | A | | 8/2012 | |
| KR | 20120097700 | A | | 9/2012 | |
| KR | 20120100533 | A | | 9/2012 | |
| KR | 101210495 | B1 | | 12/2012 | |
| TW | 201029920 | A | | 8/2010 | |
| WO | WO-9411096 | A1 | * | 5/1994 | ............. B01F 7/008 |
| WO | 9610538 | A1 | | 4/1996 | |
| WO | 2012020986 | A2 | | 2/2012 | |

OTHER PUBLICATIONS

International Search Report for Application No. PCT/KR2014/000001 dated Apr. 28, 2014.
Wofford, W.T., et al., Solubility of Potassium Hydroxide and Potassium Phosphate in Supercritical Water, J. Chem. Eng. Data 1995, 40, 968-973.

* cited by examiner

[FIG. 1]
Prior Art
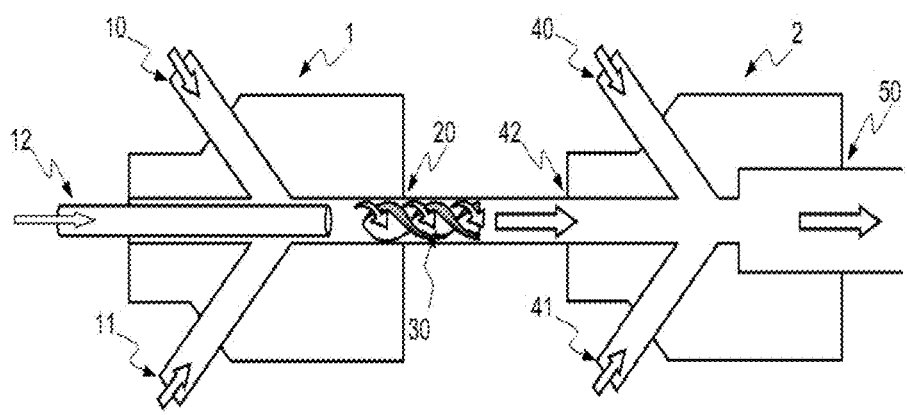
[FIG. 2]
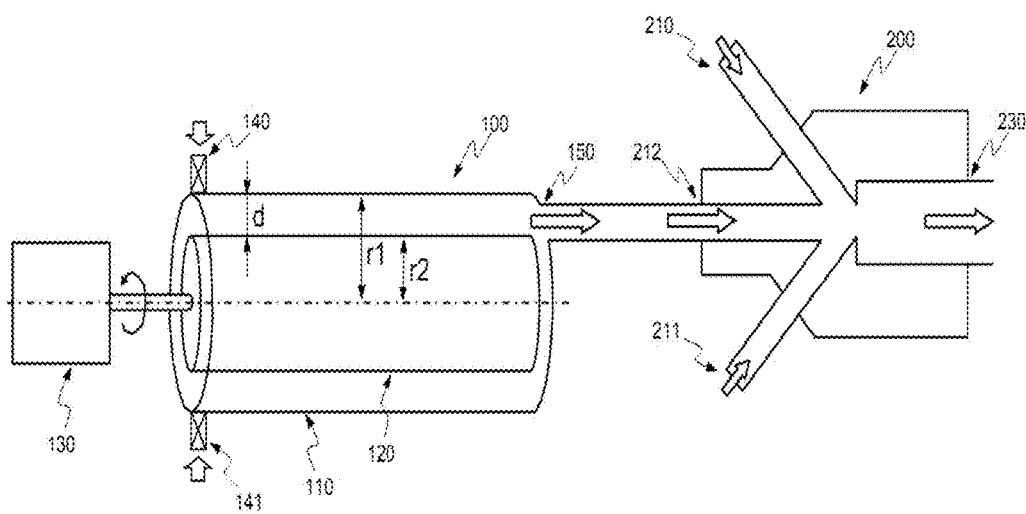

[FIG. 3]
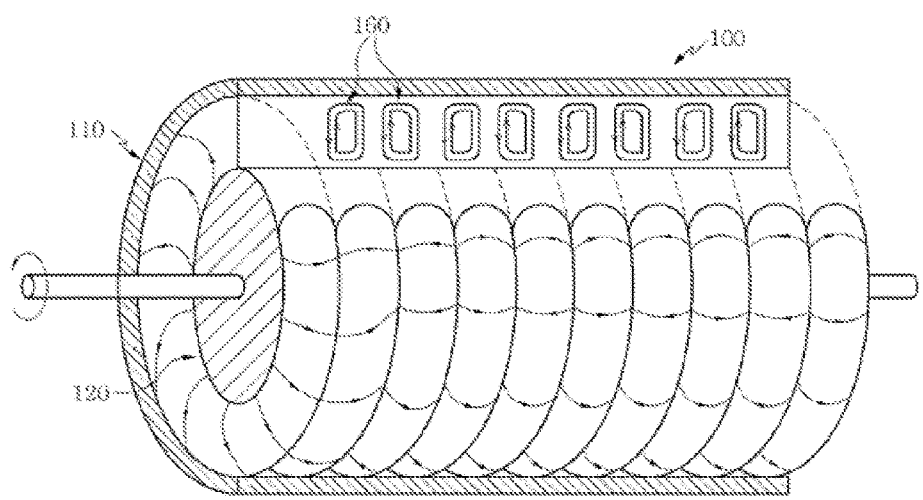

MIXING DEVICE FOR PREPARING LITHIUM COMPOSITE TRANSITION METAL OXIDE, LITHIUM COMPOSITE TRANSITION METAL OXIDE PREPARED USING THE SAME, AND METHOD OF PREPARING LITHIUM COMPOSITE TRANSITION METAL OXIDE

CROSS-REFERENCE TO RELATED APPLICATIONS

The present application is a national phase entry under 35 U.S.C. § 371 of International Application No. PCT/KR2014/000001, filed Jan. 2, 2014, which claims priority from Korean Patent Application No. 10-2013-0000714, filed Jan. 3, 2013, all of which are hereby incorporated herein by reference.

TECHNICAL FIELD

The present invention relates to a device for preparing a lithium composite transition metal oxide, a lithium composite transition metal oxide prepared using the same, and a method of preparing the lithium composite transition metal oxide.

BACKGROUND ART

Cathode active materials, which are one material constituting lithium secondary batteries, play a critical role in determining battery capacity and performance.

As cathode active materials, lithium cobalt oxides (e.g., $LiCoO_2$) that have relatively excellent overall physical properties such as excellent cycle characteristics and the like are mainly used. However, cobalt used in $LiCoO_2$ is a so-called rare metal and supply of cobalt is unstable because reserves and production thereof are limited. In addition, $LiCoO_2$ is expensive due to unstable supply of cobalt and increasing demand for lithium secondary batteries.

Under these circumstances, research on cathode active materials that can replace $LiCoO_2$ is continuously underway and use of lithium-containing manganese oxides such as $LiMnO_2$, $LiMn_2O_4$ having a spinal crystal structure, and the like and lithium-containing nickel oxides (e.g., $LiNiO_2$) is also under consideration. However, it is difficult to apply $LiNiO_2$ to actual mass-production at reasonable costs in terms of characteristics according to a preparation method thereof, and lithium manganese oxides such as $LiMnO_2$, $LiMn_2O_4$, and the like have poor cycle characteristics and the like.

Thus, recently, research on a method of using, as a cathode active material, a lithium composite transition metal oxide including at least two transition metals selected from among nickel (Ni), manganese (Mn), and cobalt (Co) or a lithium transition metal phosphate, which are representative alternative materials, has been underway.

In particular, lithium transition metal phosphates are largely divided into $Li_xM_2(PO_4)_3$ having a NASICON structure and $LiMPO_4$ having an olivine structure, and have been studied as a material having higher stability at high temperature than existing $LiCoO_2$. Currently, $Li_3V_2(PO_4)_3$ having a NASICON structure is known and, among compounds having an olivine structure, $LiFePO_4$ and $Li(Mn, Fe)PO_4$ are most widely studied.

Among the compounds having an olivine structure, in particular, $LiFePO_4$ has a voltage of ~3.5 V (vs. lithium), a high bulk density of 3.6 g/cm³, and a theoretical capacity of 170 mAh/g. In addition, $LiFePO_4$ has higher stability at high temperature than Co and uses Fe as a raw material and thus is highly applicable as a cathode active material for lithium secondary batteries in the near future.

Conventional methods of preparing such cathode active materials are largely divided into dry calcination and wet precipitation. According to dry calcination, a cathode active material is prepared by mixing an oxide or hydroxide of a transition metal such as Co or the like with lithium carbonate or lithium hydroxide as a lithium source in a dried state and then calcining the resulting mixture at a high temperature of 700° C. to 1000° C. for 5 to 48 hours. Dry calcination is, advantageously, a widely used technology for preparing metal oxides and thus is easy to approach, but is disadvantageous in that it is difficult to obtain single-phase products due to difficulties in uniform mixing of raw materials and, in the case of multi-component cathode active materials consisting of two or more transition metals, it is difficult to uniformly arrange at least two elements at the atomic level.

In wet precipitation, which is another conventional cathode active material preparation method, a cathode active material is prepared by dissolving a salt containing a transition metal such as Co or the like in water, adding alkali to the solution to precipitate the transition metal in the form of transition metal hydroxide, filtering and drying the precipitate, mixing the resulting precipitate with lithium carbonate or lithium hydroxide as a lithium source in a dried state, and calcining the mixture at a high temperature of 700° C. to 1000° C. for 1 to 48 hours. Wet precipitation is known to easily obtain a uniform mixture by co-precipitating, in particular, two or more transition metal elements, but requires a long period of time in precipitation reaction, is complicated, and incurs generation of waste acids as by-products.

In addition, various methods, such as a sol-gel method, a hydrothermal method, spray pyrolysis, an ion exchange method, and the like, have been used to prepare a cathode active material for lithium secondary batteries.

Meanwhile, a method of preparing cathode active material particles using supercritical water has recently received much attention. JP 2001-163700 discloses a method of preparing a metal oxide for cathode active materials by allowing lithium ions to react with transition metal ions in a supercritical or subcritical state in a batch-type reactor and a continuous reactor. KR 2007-008290, which was filed by the present applicant prior to the filing of the present application, discloses a method of preparing a lithium iron phosphate having an olivine crystal structure using a supercritical hydrothermal method.

However, in existing supercritical devices, a reaction fluid, which is an intermediate product generated due to reaction between raw materials, rapidly gels and thus the reactants are not uniformly mixed. In addition, fluidity of the reaction fluid is deteriorated and thus clogging of the inside of a mixer frequently occurs. As a result of previous studies, it was found that, when a reaction fluid in a gel state is strongly mixed, a sol-state reaction fluid having a uniform mixing state and very high fluidity may be obtained. However, a fixed mixer of a generally used supercritical device is inserted into a tube and thus mixing effects that are strong enough to solate a reaction fluid may not be obtained, and the fixed mixer rather acts as resistance and thus disturbs flow of the reaction fluid and therefore the above-described problems cannot be addressed.

Therefore, there is a high need to develop a technology that addresses the clogging problem by enhancing fluidity of a reaction fluid and enables uniform mixing of raw materials, in preparation of a lithium composite transition metal oxide using supercritical or subcritical water.

DISCLOSURE

Technical Problem

Therefore, the present invention has been made to solve the above problems and other technical problems that have yet to be resolved.

As a result of a variety of intensive studies and various experiments, the inventors of the present invention confirmed that, when a mixer to mix raw materials is applied using ring-shaped vortex pairs that rotate in opposite directions in a reaction space optimized for a device for preparing a lithium composite transition metal oxide using existing supercritical or subcritical water, the raw materials are uniformly mixed and a reaction fluid in a gel state is solated by a strong force and thus fluidity of the reaction fluid is secured and the clogging problem is addressed, whereby manufacturing efficiency may be enhanced, thus completing the present invention.

Technical Solution

In accordance with one aspect of the present invention, provided is a device for preparing a lithium composite transition metal oxide for lithium secondary batteries by using supercritical or subcritical water, including first and second mixers continuously arranged in a direction in which a fluid proceeds, wherein the first mixer has a closed structure including:

a hollow fixed cylinder;

a rotating cylinder having the same axis as that of the hollow fixed cylinder and having an outer diameter that is smaller than an inner diameter of the fixed cylinder;

an electric motor to generate power for rotation of the rotating cylinder;

a rotation reaction space, as a separation space between the hollow fixed cylinder and the rotating cylinder, in which ring-shaped vortex pairs periodically arranged along a rotating shaft and rotating in opposite directions are formed;

first inlets through which raw materials are introduced into the rotation reaction space; and a first outlet to discharge a reaction fluid formed from the rotation reaction space.

FIG. 1 is a side view of a conventional supercritical device.

Referring to FIG. 1, the conventional supercritical device largely includes a pre-mixer 1 and a main mixer 2. The pre-mixer 1 includes a plurality of inlets 10, 11 and 12 through which raw materials are introduced into a case and an outlet 20 to discharge a reaction fluid, and the main mixer 2 includes an inlet 42 through which the reaction fluid is introduced, inlets 40 and 41 through which supercritical water or subcritical water is introduced, and an outlet 50 to discharge the prepared lithium composite transition metal oxide. The outlet 20 of the pre-mixer 1 and the inlet 42 of the main mixer 2 mean opposite ends of a single tube, the pre-mixer 1 and the main mixer 2 are connected to each other via a tube, and a fixed mixer 30 is included in the tube.

The raw materials introduced into the pre-mixer 1 are mixed by the fixed mixer 30 and transferred to the main mixer 2 via the tube, followed by mixing with supercritical water or subcritical water introduced via the inlets 40 and 41 in the main mixer 2, thereby obtaining a lithium composite transition metal oxide.

In this regard, the fixed mixer 30 to mix raw materials has very weak mixing power and is positioned in a narrow tube and thus acts as resistance and, accordingly, a reaction fluid in a gel state cannot be solated. Consequently, clogging of the tube that connects the outlet 20 of the pre-mixer 1 and the inlet 42 of the main mixer 2 frequently occurs.

The inventors of the present application were aware that, when such a conventional supercritical device is used, a fixed mixer inserted into a tube acts as resistance in the tube and thus disturbs flow of a reaction fluid, clogging of the tube occurs over time due to gelation of the reaction fluid, and the fixed mixer has weak mixing power and thus has to have a long length in order for sufficient mixing to secure fluidity of the reaction fluid. As a result of a variety of experiments, the inventors of the present application confirmed that, when the first mixer is applied to the conventional supercritical device, the reaction fluid is uniformly mixed and fluidity thereof is sufficiently secured and thus the above-described problems are addressed and, accordingly, manufacturing efficiency may be enhanced.

In a specific embodiment, a ratio of a distance between the fixed cylinder and the rotating cylinder to an outer radius of the rotating cylinder of the first mixer may be greater than 0.05 to less than 0.4.

When the ratio of the distance between the fixed cylinder and the rotating cylinder to the outer radius of the rotating cylinder is 0.05 or less, the distance between the fixed cylinder and the rotating cylinder is too small and thus it is difficult to form the distance. Even when it is possible to form the distance therebetween, an effective volume of the rotation reaction space in which the vortex pairs are generated decreases and thus output is dramatically reduced.

Meanwhile, a vortex pair substantially acts as a single fixed mixer and thus the vortex pairs periodically arranged along a rotating shaft act as fixed mixers connected to each other. Thus, as the number of the vortex pairs increases, mixing power increases and thus flow characteristics are enhanced.

However, the size of the vortex pair is nearly similar to the distance between the fixed cylinder and the rotating cylinder and thus, as the ratio of the distance between the fixed cylinder and the rotating cylinder to the outer radius of the rotating cylinder increases or as the distance between the fixed cylinder and the rotating cylinder increases, the number of the vortex pairs in a reactor gradually decreases.

Thus, when the ratio of the distance between the fixed cylinder and the rotating cylinder to the outer radius of the rotating cylinder is 0.4 or more, the number of the vortex pairs decreases and thus flow characteristics are relatively deteriorated, when compared to a case in which the ratio of the distance between the fixed cylinder and the rotating cylinder to the outer radius of the rotating cylinder is greater than 0.05 to less than 0.4. In addition, when the ratio of the distance between the fixed cylinder and the rotating cylinder to the outer radius of the rotating cylinder is 0.4 or more, the ring-shaped vortex pairs (laminar vortex) periodically arranged along the rotating axis and rotating in opposite directions according to increase in rotation rate of the rotating cylinder, wavy vortex, modulated wavy vortex, and continuous vortex of turbulent vortex do not appear and transition from a laminar vortex region to a turbulent vortex region occurs right away, and thus, flow characteristics of the vortex pairs may be relatively reduced.

In a specific embodiment, the reaction fluid may have a kinematic viscosity of 0.4 to 400 cP and the device may have a power consumption per unit mass of 0.05 W/kg to 100

W/kg. The power consumption per unit mass may be defined as a stirring rate of the rotating cylinder.

In a specific embodiment, the vortex pairs generated in the first mixer may have a critical Reynolds number of 300 or more. When the critical Reynolds number of the vortex pairs is 300 or more, a fluid flowing between the fixed cylinder and the rotating cylinder that have the same center becomes unstable due to a tendency to proceed towards the fixed cylinder by centrifugal force and thus the vortex pairs may be formed over the entire rotation reaction space.

In a specific embodiment, the first inlets may include at least two inlets and positions thereof are not limited, but the first inlets may be formed at a starting part of the first mixer for uniform mixing of the raw materials. When two inlets are formed, a lithium source material may be introduced via one of the two inlets and a transition metal source material may be introduced via the other thereof.

In addition, to further uniformly mix the reaction fluid, the rotating cylinder may be provided at an outer surface thereof with protrusions to smoothly mix reactants.

In a specific embodiment, the second mixer may include: a hollow case; second inlets through which reaction fluids produced in the first mixer and supercritical or subcritical water are introduced into the hollow case; and a second outlet to discharge a lithium composite transition metal oxide prepared in the reactor.

The second inlets may include at least two inlets as in the first inlets. When at least two inlets are formed, reaction fluids produced in the first mixer may be introduced via any one of the inlets, and supercritical or subcritical water may be introduced via the other thereof.

In a specific embodiment, when at least three inlets are formed as the second inlets, the at least three inlets may include an inlet through which a reaction fluid is introduced and inlets formed at opposite sides of the inlet, through which supercritical or subcritical water is introduced.

In a specific embodiment, the hollow case may be provided at an inner portion thereof with at least one stirring wheel.

The stirring wheel serves to stir reaction fluids and supercritical or subcritical water while rotating inside the hollow case. Rotation of the stirring wheel is driven by introducing force of the reaction fluids and supercritical or subcritical water and thus, when a flow rate or amount thereof increases, the stirring wheel is more rapidly rotated to implement a stirring process.

The present invention also provides a method of preparing a lithium composite transition metal oxide using the above-described device.

In particular, the method may include:

(i) forming a transition metal hydroxide by introducing raw materials and an alkalifying agent into the first mixer and primarily mixing the reactants;

(ii) synthesizing a lithium composite transition metal oxide by secondarily mixing the mixture of step (i) with supercritical or subcritical water in the second mixer and drying the lithium composite transition metal oxide; and (iii) calcining the synthesized lithium composite transition metal oxide.

In a specific embodiment, the raw materials may be a transition metal-containing metal precursor compound and a lithium precursor compound.

The transition metal-containing metal precursor compound is not particularly limited so long as it is a transition metal-containing salt and an ionizable compound, in particular a water-soluble compound. In this regard, the transition metal may be a combination of a metal with paramagnetism and a metal with diamagnetism. Examples of the metal precursor compound include, without being limited to, an alkoxide, a nitrate, an acetate, a halide, a hydroxide, an oxide, a carbonate, an oxalate, a sulfate, and combinations thereof that include a transition metal. More specifically, the metal precursor compound may be a nitrate, sulfate or acetate that includes a transition metal.

The lithium precursor compound is not particularly limited so long as it contains lithium and is an ionizable water-soluble salt. For example, the lithium precursor compound may be lithium nitrate, lithium acetate, lithium hydroxide, lithium sulfate, or the like, more particularly a compound selected from the group consisting of lithium hydroxide and lithium nitrate.

In a specific embodiment, the alkalifying agent serves to provide conditions in which one or more transition metal compounds are easily hydrolyzed and precipitated as hydroxides and is not particularly limited so long as it makes a reaction solution alkaline. Non-limiting examples of the alkalifying agent include alkali metal hydroxides (NaOH, KOH, and the like), alkaline earth metal hydroxides (Ca$(OH)_2$, $Mg(OH)_2$, and the like), and ammonia compounds (aqueous ammonia, ammonium nitrate, and the like).

The alkalifying agent and the lithium precursor compound may be simultaneously mixed with water, the alkalifying agent may be mixed with water, followed by introduction of the lithium precursor compound thereinto, or the alkalifying agent and the lithium precursor compound may be first mixed, followed by addition thereof to water and mixing therein.

In the process of step (ii), reaction pressure and temperature should be suitable either for allowing the transition metal hydroxide precipitate produced in step (i) to react with lithium ions in an aqueous solution or for allowing lithium ions in the aqueous solution to be precipitated as hydroxides. For reference, hydroxides of alkali metals, such as lithium, sodium, potassium, and the like, have high solubility in water at room temperature and atmospheric pressure, but when the density of water is decreased due to high-temperature and high-pressure conditions, the hydroxides have significantly decreased solubility. For example, the solubility of KOH in water is 2.6 mol (145.8 g/100 g water) at room temperature, atmospheric pressure, and water density of 1.0 g/cm$^3$, but is decreased to 300 ppm at a temperature of 424° C. and water density of 0.139 g/cm$^3$ (262 bar) (W. T. Wofford, P. C. Dell'Orco and E. F. Gloyna, J. Chem. Eng. Data, 1995, 40, 968-973).

Accordingly, to significantly reduce the solubility of the lithium hydroxide and thus accelerate a reaction for synthesizing a lithium composite transition metal oxide, supercritical or subcritical water needs to be added and mixed. In this regard, in a specific embodiment, the supercritical or subcritical water means high-temperature and high-pressure water having a pressure of 180 to 550 bar and a temperature of 200° C. to 700° C.

When the precipitated transition metal hydroxides and the lithium aqueous solution are instantaneously mixed with high-temperature water, the temperature of the mixture is rapidly increased to subcritical or supercritical temperature from room temperature. Even after adding supercritical or subcritical water, it is necessary to continuously maintain supercritical or subcritical conditions.

The temperature in the calcining process of step (iii) is not particularly limited and may be in the range of 600° C. to 1200° C.

When the calcination temperature is less than 600° C., growth of particles is insufficient, sintering between particles hardly occurs and thus the particles have large specific surface area and low tap density. In addition, growth of crystals is insufficient and the lithium composite transition metal oxide is not sufficiently stabilized, leading to deteriorated cycle characteristics. On the other hand, when the calcination temperature exceeds 1200° C., sintering between particles is excessive and thus performance of the particles as a cathode active material is deteriorated.

Before, after or during any one of the steps (i) to (iii), at least one additive selected from the group consisting of a binder, a sintering aid, a doping agent, a coating agent, a reducing agent, an oxidizing agent, acid, carbon or a carbon precursor, a metal oxide, and a lithium compound may be further added. In particular, a lithium composite transition metal oxide having an olivine-type crystal structure, for example, LiFePO$_4$, may be prepared by appropriately using phosphoric acid, carbon or a carbon precursor, sucrose, or the like during the preparation process thereof.

The binder may be used to spherize granules and to improve particle size and may, for example, be aqueous ammonia, polyvinyl alcohol (PVA), a mixture thereof, or the like. The sintering aid may be used during high-temperature calcination of granules to reduce calcination temperature or to increase sintering density and examples thereof include, without being limited to, metal oxides such as alumina, B$_2$O$_3$, and MgO, precursors thereof, and Li compounds such as LiF, LiOH, and LiCO$_3$. The doping agent and the coating agent are used to coat outer surfaces of electrode active material crystals with metal oxide ultrafine particles in order to enhance durability of a calcined material when used in batteries and examples thereof include, without being limited to, metal oxides such as alumina, zirconia, titania, and magnesia, and precursors thereof.

The reducing agent or the oxidizing agent may be used to control atmosphere of each step to a reducing or oxidative atmosphere. The reducing agent may, for example, be hydrazine, oxalic acid, sucrose, fructose, ascorbic acid (Vitamin C), hydrogen, carbon, hydrocarbon, a mixture thereof, or the like. The oxidizing agent may, for example, be oxygen, hydrogen peroxide, ozone, a mixture thereof, or the like. The acid is used in the form of a reactant such as a phosphoric acid compound, a sulfuric acid compound, or the like and may, for example, be phosphoric acid, sulfuric acid, a mixture thereof, or the like. The carbon or the carbon precursor may be coated on a surface of a material prepared to increase electrical conductivity of the prepared material or to provide a reducing atmosphere and, in particular, is useful for a lithium composite transition metal oxide having an olivine-type crystal structure. The lithium compound may participate in the reaction during the calcination process to increase the amount of lithium in the lithium composite transition metal oxide and may, for example, be an Li compound such as LiF, LiOH, LiNO$_3$, LiCO$_3$, or the like.

The present invention also provides a lithium composite transition metal oxide prepared using the above-described method by using the above-described device.

In a specific embodiment, a lithium composite transition metal oxide that may be provided according to the present invention may be any one of compounds represented by Formulas 1 to 4 below, in particular LiFePO$_4$, but embodiments of the present invention are not limited thereto.

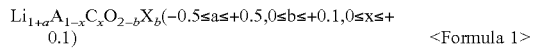

$$\text{Li}_{1+a}\text{A}_{1-x}\text{C}_x\text{O}_{2-b}\text{X}_b (-0.5 \leq a \leq +0.5, 0 \leq b \leq +0.1, 0 \leq x \leq +0.1) \quad \text{<Formula 1>}$$

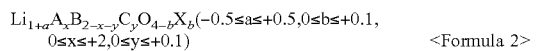

$$\text{Li}_{1+a}\text{A}_x\text{B}_{2-x-y}\text{C}_y\text{O}_{4-b}\text{X}_b (-0.5 \leq a \leq +0.5, 0 \leq b \leq +0.1, 0 \leq x \leq +2, 0 \leq y \leq +0.1) \quad \text{<Formula 2>}$$

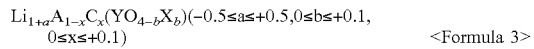

$$\text{Li}_{1+a}\text{A}_{1-x}\text{C}_x(\text{YO}_{4-b}\text{X}_b)(-0.5 \leq a \leq +0.5, 0 \leq b \leq +0.1, 0 \leq x \leq +0.1) \quad \text{<Formula 3>}$$

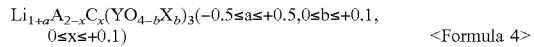

$$\text{Li}_{1+a}\text{A}_{2-x}\text{C}_x(\text{YO}_{4-b}\text{X}_b)_3(-0.5 \leq a \leq +0.5, 0 \leq b \leq +0.1, 0 \leq x \leq +0.1) \quad \text{<Formula 4>}$$

wherein A is at least one element selected from among transition metals having a six-coordinate structure;

B is at least one element selected from among transition metals having a four-coordinate structure;

C is at least one element selected from the group consisting of alkaline earth metals and Group 3B elements;

X is at least one element selected from the group consisting of Group 5B, 6B and 7B elements; and Y is at least one element selected from among metalloids or metals having a four-coordinate structure.

In the lithium composite transition metal oxide according to the present invention, mixing of elements is easy and thus it is easy to substitute each element with other elements and add other elements thereto in order to enhance electrochemical properties. For example, the transition metal site in the compounds of Formulas 1 to 4 may be doped with trace amounts of other alkaline earth metals and Group 3B elements. In addition, the oxygen site in the compounds of Formulas 1 to 4 may be easily substituted with an element selected from among Group 5B, 6B, 7B elements having strong electron affinity.

With respect to the transition metals, those having a six-coordinate structure are generally stable, but in a spinel structure such as Formula 2 above, the transition metal may have four-coordinate and six-coordinate structures. Thus, in a specific embodiment, in Formula 1 above, A having a six-coordinate structure may be at least one element selected from among Ni, Co, and Mn. In Formula 2 above, B having a four-coordinate structure or A having a six-coordinate structure may be at least one element selected from among Ni, Co, and Mn. In addition, in Formula 3 or 4 above, A having a six-coordinate structure may be at least one element selected from among Fe, Mn, Co, Ni, and V and Y having a four-coordinate structure may be an element selected from among P, Ti, V, and Si.

In addition, in a specific embodiment, in Formulas 1 to 4 above, C may be an element selected from among Al, Mg, and Ti, and X may be F, S, or N.

In Formulas 1 to 4 above, a may satisfy the following condition: $-0.5 \leq a \leq +0.5$. When a is less than $-0.5$, crystallinity is insufficient. On the other hand, when a exceeds 0.5, an excess amount of Li is present and thus impurities such as Li$_2$CO$_3$ and the like are formed, which results in deteriorated battery performance and stability.

The present invention also provides a cathode including the lithium composite transition metal oxide as a cathode active material and a lithium secondary battery including the same.

The cathode may be fabricated by, for example, coating a mixture of a cathode active material including the lithium composite transition metal oxide, a conductive material, and a binder on a cathode current collector and drying the coated cathode current collector. As desired, the mixture may further include a filler.

The lithium secondary battery may include the cathode, an anode, a separator, and a lithium salt-containing non-aqueous electrolyte and may be manufactured by interposing a porous separator between the cathode and the anode and injecting the electrolyte thereinto, using a method generally known in the art.

Materials that may be included in the cathode, the anode, the separator, and the electrolyte are known in the art, the disclosure of which is incorporated herein by reference, and thus, a detailed description thereof will be omitted herein.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a side view of a conventional supercritical device;

FIG. 2 is a side view of a device according to an embodiment of the present invention;

FIG. 3 is a view illustrating ring-shaped vortex pairs generated in a rotation reaction space of a first mixer of the device and flow type of a reaction fluid.

BEST MODE

Now, the present invention will be described in more detail with reference to the following examples. These examples are provided only for illustration of the present invention and should not be construed as limiting the scope and spirit of the present invention.

FIG. 2 is a side view of a device according to an embodiment of the present invention. FIG. 3 is a view illustrating ring-shaped vortex pairs generated in a rotation reaction space of a first mixer of the device of FIG. 2 and flow type of a reaction fluid.

Referring to FIG. 2, a device for preparing a lithium composite transition metal oxide for lithium secondary batteries by using supercritical or subcritical water largely includes a first mixer 100 and a second mixer 200.

The first mixer 100 includes a hollow fixed cylinder 110 and a rotating cylinder 120 disposed in the hollow fixed cylinder 110, the rotating cylinder 120 having a rotational axis that is coincident with the central axis of the fixed cylinder 110, and the rotating cylinder 120 having an outer diameter (2×r2) smaller than an inner diameter (2×r1) of the fixed cylinder 110. A rotation reaction space is formed between the fixed cylinder 110 and the rotating cylinder 120, and the fixed cylinder 110 has first inlets 140 and 141 through which raw materials are introduced into the rotation reaction space and a first outlet 150 to discharge the reaction fluid. The fixed cylinder 110 is provided at a side surface thereof with an electric motor 130 to generate power for rotation of the rotating cylinder 120.

An effective volume of the rotation reaction space is determined by a ratio (d/r2) of a distance d between the fixed cylinder 110 and the rotating cylinder 120 to an outer radius r2 of the rotating cylinder 120.

Referring to FIGS. 2 and 3, when the rotating cylinder 120 is rotated by power generated by the electric motor 130 and thus reaches a critical Reynolds number, reaction fluids of raw materials introduced into the rotation reaction space via the first inlets 140 and 141 become unstable by centrifugal force applied towards the fixed cylinder 110 from the rotating cylinder 120 and, as a result, ring-shaped vortex pairs 160 rotating in opposite directions along a rotating shaft are periodically arranged in the rotation reaction space.

The length of the ring-shaped vortex pairs 160 in a gravity direction is almost the same as the distance d between the fixed cylinder 110 and the rotating cylinder 120.

The outside of the rotating shaft may be sealed by a sealing member such as an O-ring to prevent air from being sucked into a gap between the rotating shaft and a bearing when the rotating cylinder 120 is rotated.

Referring back to FIG. 2, the reaction fluids mixed by the vortex pairs 160 of the first mixer 100 are discharged via the first outlet 150, and the reaction fluids are introduced into the second mixer 200 via a second inlet 212 connected to the first outlet 150 via a tube.

The second mixer 200 includes second inlets 210, 211 and 212 through which reaction fluids and supercritical or subcritical water are introduced and a second outlet 230 to discharge the prepared lithium composite transition metal oxide. In this regard, among the second inlets 210, 211 and 212, the inlets 210 and 211 through which supercritical or subcritical water is introduced are formed at opposite sides of the inlet 212 through which reaction fluids are introduced. Except for these features, the second mixer 200 has almost the same structure as that of the main mixer 2 of the conventional supercritical device of FIG. 1.

The reaction fluids introduced into the second mixer 200 are mixed with supercritical or subcritical water introduced via the second inlets 210 and 211 to prepare a lithium composite transition metal oxide, and the prepared lithium composite transition metal oxide is discharged via the second outlet 230.

As such, when the first mixer 100 is applied to a conventional pre-mixer, it is possible to uniformly mix raw materials and a reaction fluid in a gel state produced by reaction between the raw materials may be solated by a strong force and thus fluidity of the reaction fluid may be secured and clogging problems may be addressed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a device according to the present invention includes a mixer to mix raw materials using ring-shaped vortex pairs rotating in opposite directions in an optimized reaction space and thus it is possible to uniformly mix the raw materials and a reaction fluid in a gel state produced by reaction between the raw materials may be solated by a strong force and, consequently, fluidity of the reaction fluid may be secured and clogging problems may be addressed, which results in enhanced manufacturing efficiency.

In addition, the device has a relatively wide space and thus enables supply of reaction fluids having a uniform flow rate due to no impact of pressure according to introduction of raw materials, and the device has little dead volume and thus enables uniform mixing of raw materials. Accordingly, a lithium composite transition metal oxide with good quality may be provided.

The invention claimed is:

1. A method for preparing a lithium composite transition metal oxide for lithium secondary batteries, comprising:
   introducing reactants into a first mixer and mixing the reactants to form a reaction fluid in the form of a transition metal hydroxide, the reactants including raw materials and an alkalifying agent, the raw materials being introduced into a rotation reaction space of the first mixer through first inlets, wherein the first mixer has a closed structure comprising:
   a hollow fixed cylinder;
   a rotating cylinder positioned within the hollow fixed cylinder and having a rotational axis that is coincident with the central axis of the hollow fixed cylinder, the rotating cylinder having an outer diameter that is smaller than an inner diameter of the fixed cylinder; and an electric motor to generate power for rotation of the rotating cylinder;

wherein the rotation reaction space is defined by a separation space between the hollow fixed cylinder and the rotating cylinder forming ring-shaped vortex pairs periodically arranged along the rotational axis and rotating in opposite directions;

discharging the reaction fluid formed in the rotation reaction space from a first outlet of the first mixer and into a second mixer; and mixing the reaction fluid with supercritical or subcritical water in the second mixer to synthesize a lithium composite transition metal oxide.

2. The method according to claim 1, wherein a ratio of a distance between the fixed cylinder and the rotating cylinder to an outer radius of the rotating cylinder of the first mixer is greater than 0.05 to less than 0.4.

3. The method according to claim 1, wherein the fluid has a kinematic viscosity of 0.4 cP to 400 cP and a device including the first and second mixers has a power consumption per unit mass of 0.05 W/kg to 100 W/kg.

4. The method according to claim 1, wherein the vortex pairs formed in the first mixer have a critical Reynolds number of 300 or more.

5. The method according to claim 1, wherein the first inlets comprise at least two inlets.

6. The method according to claim 1, wherein the second mixer comprises:

a hollow case;

second inlets through which the reaction fluid produced in the first mixer and the supercritical or subcritical water are introduced into the hollow case; and a second outlet to discharge the lithium composite transition metal oxide prepared in the second mixer.

7. The method according to claim 6, wherein the second inlets to introduce supercritical or subcritical water are formed at opposite sides of an inlet to introduce the reaction fluid into the second mixer.

8. The method according to claim 1, further comprising:

drying the lithium composite transition metal oxide; and calcining the lithium composite transition metal oxide.

9. The method according to claim 8, wherein the calcining enhances intercrystalline coherence by growing crystals of lithium composite transition metal oxide particles synthesized by the synthesizing.

10. The method according to claim 8, wherein the raw materials are a transition metal-containing metal precursor compound and a lithium precursor compound.

11. The method according to claim 10, wherein the transition metal-containing metal precursor compound is a nitrate, sulfate or acetate containing a transition metal, and the lithium precursor compound is a compound selected from the group consisting of lithium hydroxide and lithium nitrate.

12. The method according to claim 8, wherein the alkalifying agent is a compound selected from the group consisting of alkali metal hydroxides, alkaline earth metal hydroxides, and ammonia compounds.

13. The method according to claim 8, wherein, in the synthesizing, the supercritical or subcritical water is water having a pressure of 180 bar to 550 bar and a temperature of 200° C. to 700° C.

14. The method according to claim 8, wherein calcination temperature of the calcining is in a range of 600° C. to 1200° C.

* * * * *